US 9,244,571 B2

(12) United States Patent
Ho et al.

(10) Patent No.: US 9,244,571 B2
(45) Date of Patent: Jan. 26, 2016

(54) TOUCH SENSING DEVICE

(75) Inventors: Kai-Ting Ho, Taipei (TW); Hsuan-I Pan, Zhubei (TW); Guo-Kiang Hung, Zhubei (TW)

(73) Assignee: MStar Semiconductor, Inc. (TW)

( * ) Notice: Subject to any disclaimer, the term of this patent is extended or adjusted under 35 U.S.C. 154(b) by 938 days.

(21) Appl. No.: 13/421,758

(22) Filed: Mar. 15, 2012

(65) Prior Publication Data

US 2012/0235691 A1    Sep. 20, 2012

(30) Foreign Application Priority Data

Mar. 15, 2011   (TW) ............................... 100108828 A

(51) Int. Cl.
G01R 27/26 (2006.01)
G06F 3/041 (2006.01)
G06F 3/044 (2006.01)

(52) U.S. Cl.
CPC .............. *G06F 3/044* (2013.01); *G06F 3/0418* (2013.01); *G06F 2203/04107* (2013.01)

(58) Field of Classification Search
CPC .................. G06F 3/0418; G06F 3/044; G06F 2203/04107
USPC ........................... 324/658–690; 345/173–178
See application file for complete search history.

(56) References Cited

U.S. PATENT DOCUMENTS

| | | | | |
|---|---|---|---|---|
| 2008/0252608 A1* | 10/2008 | Geaghan | ....................... | 345/173 |
| 2010/0117981 A1* | 5/2010 | Chen et al. | ................... | 345/174 |
| 2011/0018560 A1* | 1/2011 | Kurashima | .............. | G06F 3/044 |
| | | | | 324/679 |

FOREIGN PATENT DOCUMENTS

| | | |
|---|---|---|
| CN | 101089802 A | 12/2007 |
| CN | 101719038 A | 6/2010 |
| CN | 101887334 A | 11/2010 |
| CN | 101968702 A | 2/2011 |
| TW | 200428076 A | 12/2004 |
| TW | 201102901 A | 1/2011 |

* cited by examiner

*Primary Examiner* — Melissa Koval
*Assistant Examiner* — Farhana Hoque
(74) *Attorney, Agent, or Firm* — Han IP Corporation

(57) ABSTRACT

A touch sensing device is provided. A shielding plate is provided for covering and shielding wires that route sensing electrodes to a flexible circuit board. Alternatively, a conductive layer of the circuit board is applied for shielding a plurality of contacts of the electrodes and wires. Wires that couple two same typed electrodes extend as a shielding plate for shielding contacts of another type of electrodes. An auxiliary electrode bordering outside the sensing electrodes can be provided to compensate fringe effects of the sensing electrodes.

18 Claims, 14 Drawing Sheets

TOUCH SENSING DEVICE

CROSS-REFERENCE TO RELATED APPLICATION

This application claims the benefit of Taiwan Patent Application Serial No. 100108828, filed Mar. 15, 2011, the entirety of which is incorporated herein by reference.

BACKGROUND

1. Technical Field

The invention relates in general to a touch sensing device, and more particularly to a capacitive touch sensing device with a shielding plate and/or an auxiliary electrode applied for reducing cost and improving touch sensing accuracy of the touch sensing device.

2. Description of the Related Art

The touch control technology brings people a user-friendly, intuitive and easy-to-use user interface, and is thus one of the most prevailing human-machine interface (HMI) technologies. It is therefore a research and development target for manufacturers in the modern information industry to provide a low-cost and high-performance touch sensing device/touch panel.

SUMMARY

A touch sensing device comprises a plurality of electrodes, a plurality of wires and a conductive shielding plate. The electrodes are disposed on a plane and partially in a sensing area of the plane. Each wire is coupled to one or a plurality of electrodes to route and extends to the outside of the sensing area. The shielding plate, being electrically insulated from the wires, is disposed outside the sensing area to cover a part or all of the wires, so that a projection of the shielding plate upon the plane is located outside the sensing area and partially or entirely overlaps with a projection of at least one wire upon the plane. The shielding plate borders the sensing area along two or more joining sides of the sensing area to shield the wires in the sensing area in an enclosing manner.

The electrodes and wires in a touch sensing device are generally made of different conductive materials, with the former being an indium tin oxide (ITO) conductive layer and the latter being a silver paste layer, for example. Since a coupling location, i.e., a wire bonding point, involves the connection of two heterogeneous materials, a considerable area is required for ensuring a stable contact between the two. To increase a resolution of a position of touch control, two or more differently shaped electrodes are adopted by the present invention to perform sensing. The differently shaped electrodes are alternately arranged along an x-direction, whereas two or more same shaped electrodes are coupled as one group that then reflects a total capacitance change. Preferably, two conductive layers of a flexible circuit board are applied for realizing the shielding plate/grouping.

The present invention further discloses a touch sensing device comprising a plurality of electrodes, a plurality of first wires, a plurality of second wires and a conductive shielding plate. The first conductive wires are coupled to an electrode, and two or more same typed/same shaped electrodes and the corresponding first wire are coupled and grouped via a second wire. Each first wire is partially disposed on a conductive layer of a circuit board, and the second wires and the shielding plate are disposed on another conductive layer of the circuit board.

The present invention further discloses a touch sensing device comprising a plurality of same shaped first electrodes, a plurality of same shaped second electrodes, a plurality of first wires, and a plurality of second wires. The first electrodes and the second electrodes are alternately arranged along an x direction of a sensing area, in a way that the first electrodes are respectively neighboring to a second electrode along the x direction, and the second electrodes are respectively neighboring to a first electrode along the x direction. Each first wire couples and groups two or more first electrodes, and each second wire couples and thus groups two or more second electrodes. The first wires are disposed on a silver paste layer, and the second wires, the first electrodes and the second electrodes are disposed on a same ITO conductive layer. The ITO conductive layer is electrically insulated from the silver paste layer. The first wires are extended to form a shielding plate, such that a planar projection of the first wires partially or entirely overlaps with a planar projection of at least one of the second wire, so that the second wires are shielded by the first wires. A sectional size of the first electrodes gradually increases from a first end to a second end of the first electrodes along the x direction, and the first wires are coupled to corresponding first electrodes at the second end. When a user touched position moves from the first end towards the second end of the first electrodes, a capacitance change coupled by the first electrodes increases along with the increase of the sectional size. When a touched position approaches or exceeds beyond the second end of the first electrodes in a way that the first wires at the second end also couple the capacitance change, an outcome of coordinate analysis stays correct since the capacitance change reflected by the first electrodes correctly increments in a gradual manner. Alternatively, the first wires, the second wires, the first electrodes and the second electrodes are disposed on a same ITO conductive layer.

The present invention further discloses a touch sensing device comprising a plurality of sensing electrodes and an auxiliary electrode. The auxiliary electrode, disposed outside a sensing area, is electrically insulated from the sensing electrodes while the auxiliary electrode is disposed on a same conductive layer as the sensing electrodes, so as to compensate fringe effects of the sensing electrodes. The sensing electrodes are arranged with a predetermined distance between one another along an x direction, and a spacing distance between the sensing electrodes and the auxiliary electrode along the x direction may equal to the predetermined distance. Preferably, the spacing distance between the sensing electrodes and the auxiliary electrode along the x direction may equal to the predetermined distance, thus compensating the fringe effects imposed on the outermost electrodes.

The above and other aspects of the invention will become better understood with regard to the following detailed description of the preferred but non-limiting embodiments. The following description is made with reference to the accompanying drawings.

DETAILED DESCRIPTION

In a capacitive touch sensing device, a plurality of touch sensing electrodes are provided in a sensing area to sense a capacitance change triggered by a user touch to accordingly analyze a coordinate of a touched position. To transmit the capacitance change sensed by the electrodes to a processing circuit (e.g., a control chip) that analyzes the coordinate, the electrodes are routed to a circuit board by wires. However, it is possible that equivalent capacitance of the wire is erroneously coupled as the capacitance change to lead to an incorrect calculation outcome. In an embodiment, a conductive shielding plate is applied to cover the wires routed around the sensing area to shield an unexpected capacitance change.

Figure 1:
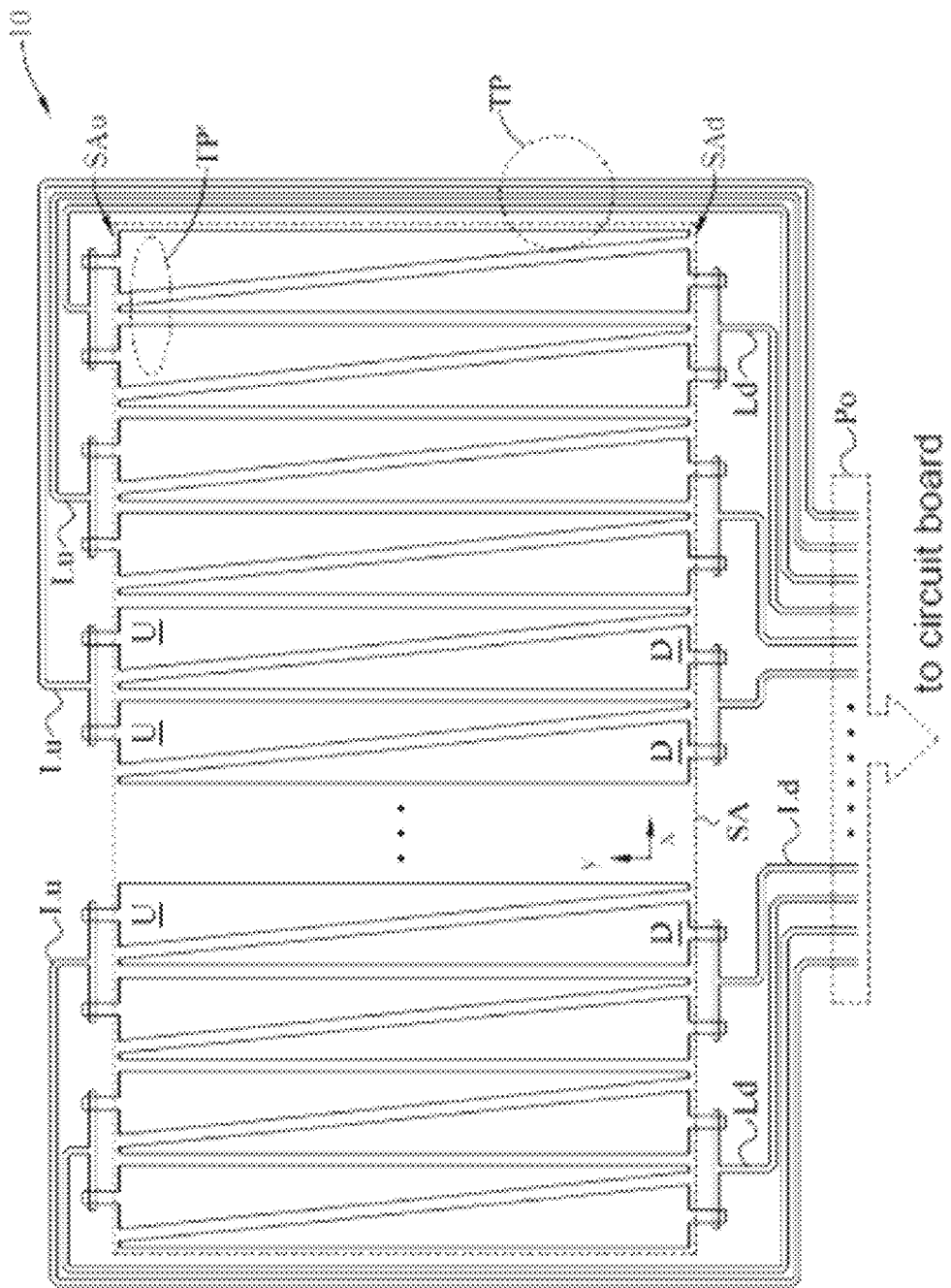
FIGS. 1 and 2 illustrate a touch sensing device according to an embodiment of the present invention.
Figure 2:
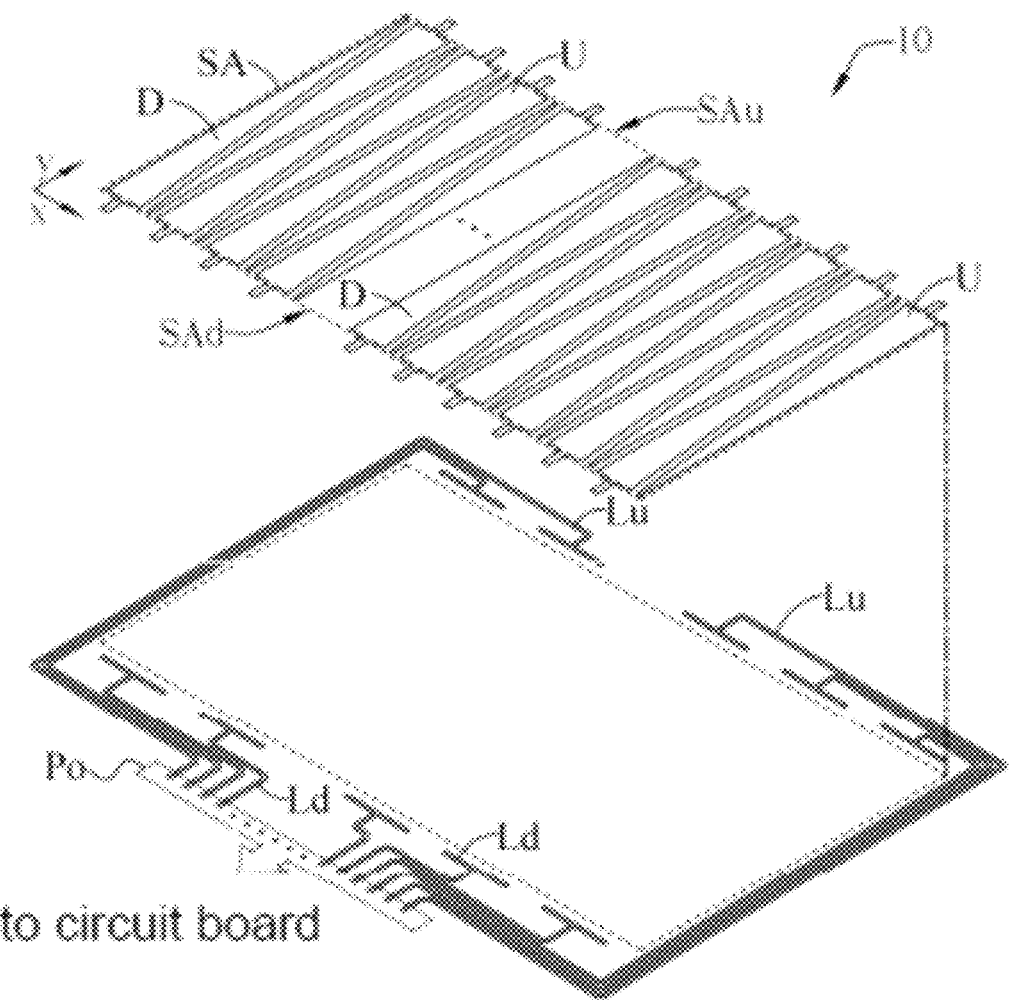

FIGS. 1 and 2 respectively show projected plane view and an elevational view of a touch sensing device 10. The touch sensing device 10 comprises a plurality of electrodes U and a plurality of electrodes D, and a plurality of wires Lu and a plurality of wires Ld. The electrodes U and D are provided at a same ITO conductive layer that constructs an xy plane, and most of the electrodes U and D are located within a sensing area SA of the plane to sense a user touch control occurring in the sensing area SA. When the touch sensing device 10 is applied to a touch panel, the sensing area SA positions in a visible region, through which content to be displayed by the touch panel is presented to the user. The electrodes U and D are partially extended outside the touch sensing area SA, and are coupled to the corresponding wires Lu and Ld, respectively. In the embodiment illustrated in FIGS. 1 and 2, the wires Lu are coupled to two corresponding electrodes U and are grouped as one with the two electrodes U. Thus, a total capacitance change sensed by the two electrodes U is then conducted via the wire Lu to the outside of the sensing area SA. Similarly, each of the wires Ld also groups two corresponding coupled electrodes, for example, to transmit a capacitive change reflected by its group to the outside of the sensing area SA.

When analyzing/determining an x coordinate of a touched position, different groups respectively correspond to different x coordinates since the electrodes U and D are arranged along the x direction. When a capacitance change reflected by a particular group is relatively larger, it means that the x coordinate of the touch position is close to the x coordinate corresponding to the particular group, so that the x coordinate of the touched position can be accordingly determined.

When analyzing/determining a y coordinate of a touch position, a sectional size (i.e., a sectional width) of each of the electrodes U in the x direction appears as a shape having a wider upper width and a narrower lower width as a +y direction increases, and a sectional size (i.e., a sectional width) of each of the electrodes D in the x direction appears as a shape having a narrower upper width and a wider lower width as a +y direction decreases. Therefore, when a capacitance change sensed by the electrodes U is relatively larger and that sensed by the electrodes L is relatively smaller, it means that the y coordinate of the touch position is near an upper side of the sensing region SA, so that the y coordinate of the touched position can be accordingly determined.

As shown in FIGS. 1 and 2, the wires Lu border the sensing area SA from an upper side SAu along a left side or a right side of the sensing area SA to route to an output region Po, and are coupled to the circuit board at the output region Po. The wires Ld start routing from a lower side Sad of the sensing area SA to the output region Po, and are also coupled to the circuit board at the output region Po as the wires Lu. In the view that the wires Lu and Ld respectively start routing from the upper and lower sides of the sensing area SA, the overall structure is regarded as a dual-end outgoing line structure.

However, since the wires Lu route along the left and right sides of the sensing area SA, an unexpected capacitance change is also coupled by mistake to lead to an incorrect calculation outcome. As shown in FIG. 1, when a user touched position TP falls at the wires Lu at the right side of the sensing area SA, the wires Lu couple the touch-triggered capacitance change that is then mixed in electronic signals transmitted by the wires Lu. When analyzing the touched position, the capacitance change mixed by mistake is regarded as the capacitance change sensed by the sensing electrodes U. In other words, it appears as the electrodes U at the right side of the sensing area SA sensed the capacitance change. As a result, a touched position TP' calculated according to the above situation may be closer to the upper end of the sensing area SA than the actual touched position TP, meaning that a corresponding calculated coordinate is incorrect.

Figure 3:
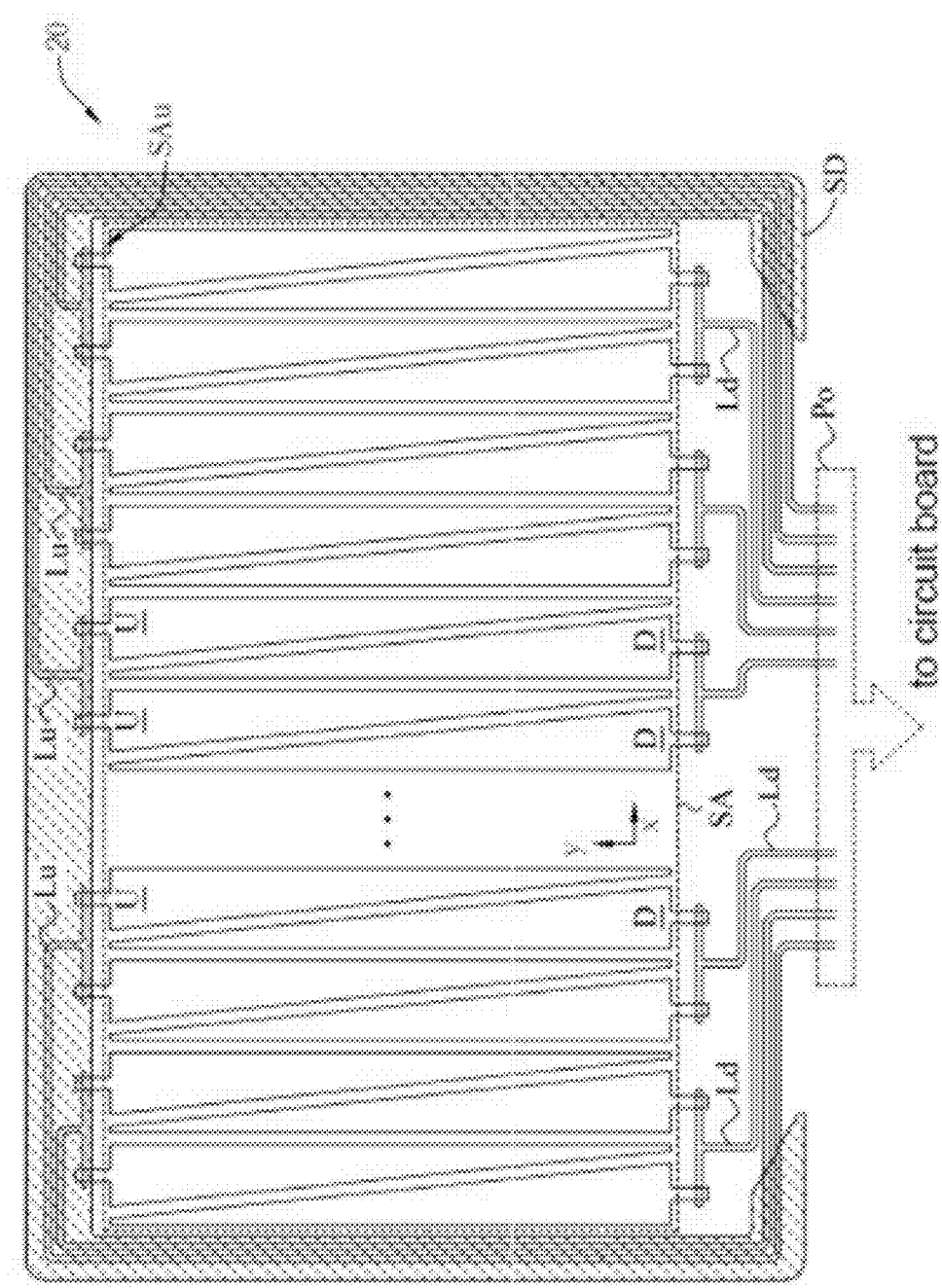
FIGS. 3 and 4 illustrate a touch sensing device according to an embodiment of the present invention.
Figure 4:
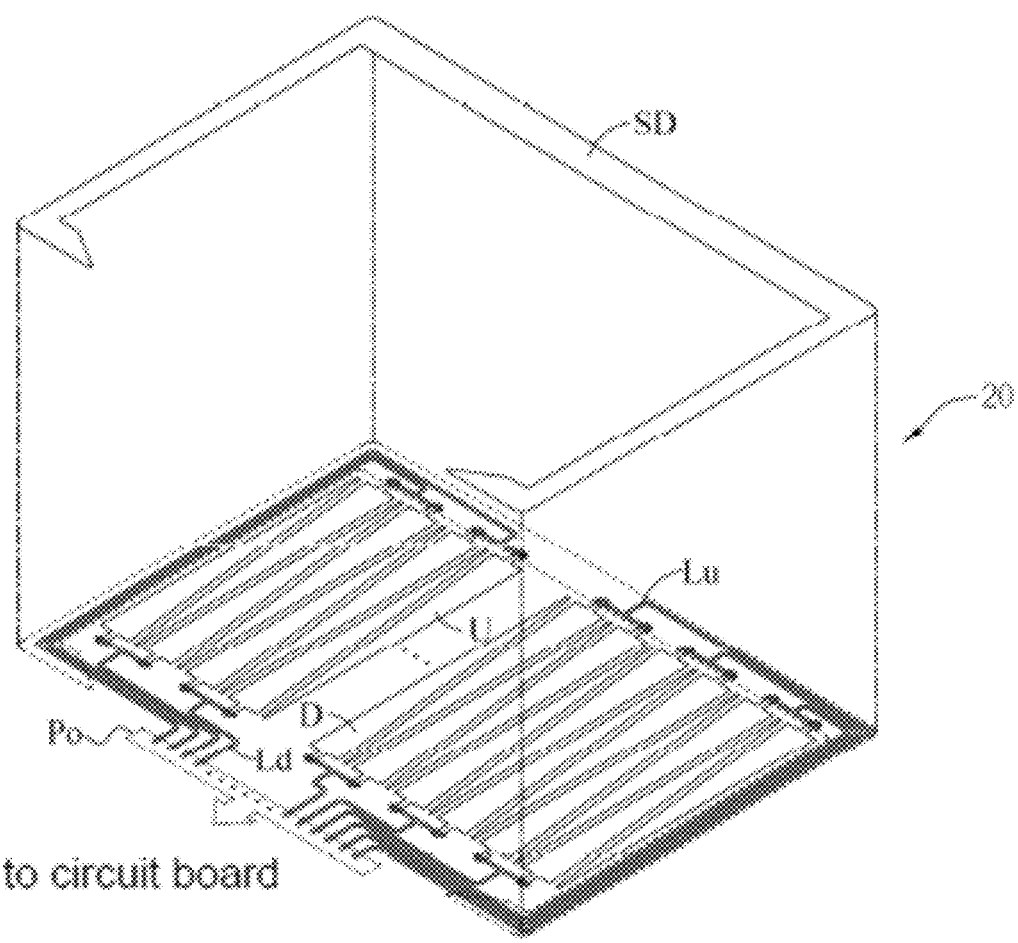

FIGS. 3 and 4 respectively show a plane view and an elevational view of a touch sensing device 20 according to an embodiment of the present invention. The touch sensing device 20 comprises a plurality of electrodes U, a plurality of electrodes L, a plurality of wires Lu and a plurality of wires Ld. The touch sensing device 20, with a dual-end outgoing line structure, routes and integrates electronic signals of grouped electrodes to an output region Po, such that wires Lu and Ld are coupled to a circuit board, e.g., a flexible circuit board, at the output region Po. The touch sensing device 20 further comprises a conductive shielding plate SD. The conductive shielding plate SD, designed as electrically insulated from the wires Lu and Ld, borders the sensing area SA from an upper side SAu of the sensing area SA along left and right sides of the sensing area SA to surround the sensing area SA along routes of the wires Lu and covers the wires Lu, so that a planar projection of the shielding plate SD falls outside the sensing area SA and at least partially overlaps with a plane projection of the wires Lu. By shielding the wires Lu with the shielding plate SD, the wires Lu are prevented from erroneously coupling an unexpected capacitance change. Preferably, the wires Lu and Ld are provided at a silver paste layer, the shielding plate SD is provided at another silver paste layer, and the two silver paste layers are electrically insulated.

Figure 5:
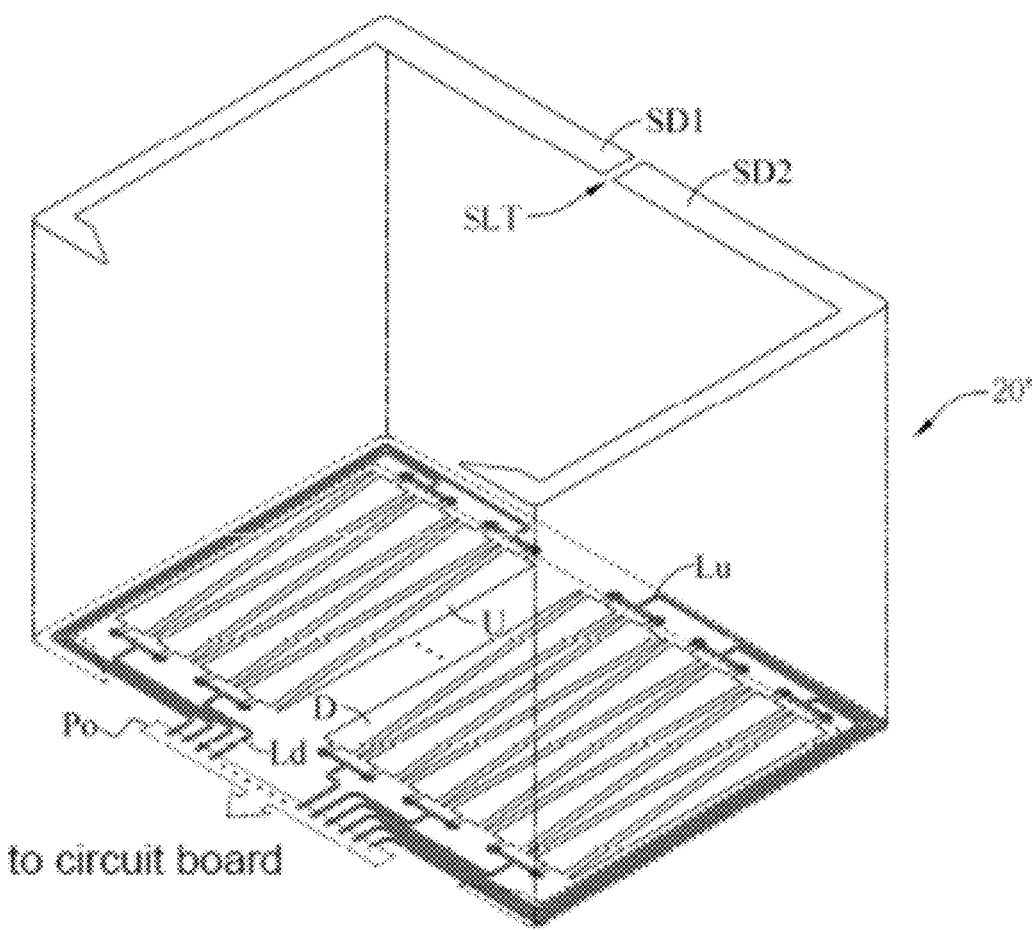
FIG. 5 is a touch sensing device according to another embodiment of the present invention.

FIG. 5 shows an elevational view of a touch sensing device 20' according to another embodiment of the present invention. In the touch sensing device 20', the wires Lu are shielded by two shielding plates SD1 and SD2, which are provided at a same conductive layer (e.g., a silver paste layer) and are electrically insulated from each other by a slot SLT. Alternatively, routing wires of a dual-end outgoing line structure may also be shielded by a plurality of shielding plates.

Figure 6:
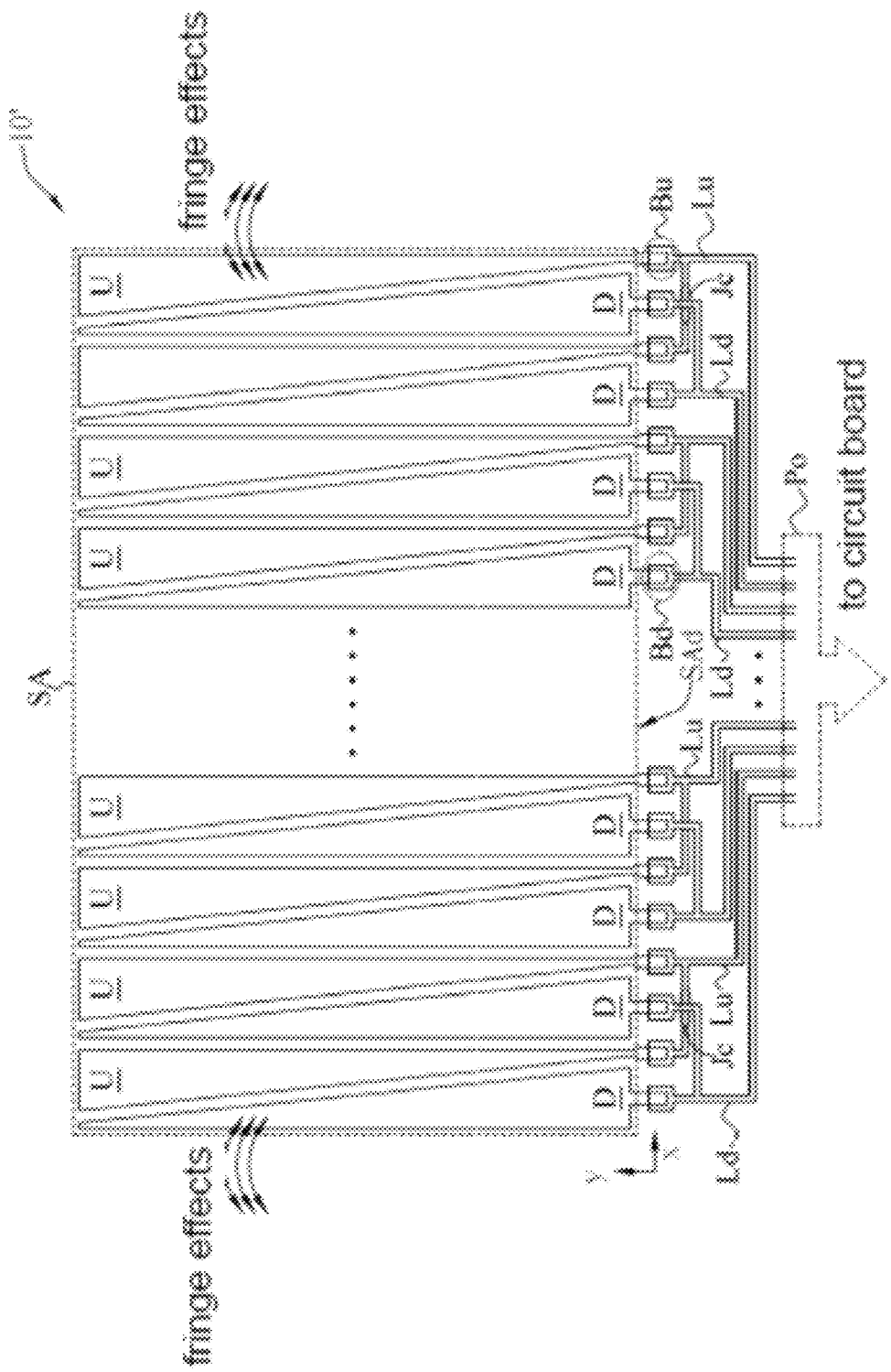
FIG. 6 shows a touch sensing device according to another embodiment of the present invention.

FIG. 6 shows a plane view of a touch sensing device 10' according to an embodiment of the present invention. In the sensing area SA, a plurality of electrodes U and D are alternately arranged, and a plurality of wires Lu and Ld are provided. The wires Lu respectively group two electrodes U as one and route to an output region Po, and the wires Ld respectively group two electrodes D as one and route to the output region Po, so as to transmit electronic signals of the grouped electrodes to a circuit board. Different from FIG. 1, the wires Lu and Ld in FIG. 6 start routing from a lower side SAd of the sensing area SA, and therefore the structure illustrated in FIG. 6 is regarded as a single-end outgoing line structure.

When the electrodes D and the electrodes U are alternately arranged in a row along the x direction in the sensing area SA. Except the leftmost electrode D and the rightmost electrode U, the remaining electrodes D in the row are respectively left and right neighboring to an electrode U, and the remaining electrodes U are also respectively left and right neighboring to an electrode U. In this embodiment, the leftmost electrode D bears more apparent fringe effects since it is only right neighboring to an electrode U. More specifically, touch sensing characteristics and performance of the leftmost electrode D differ from those of the other electrodes D. Similarly, being influenced by fringe effects, the rightmost electrode U does not have exactly the same operation characteristics of the other electrodes U. It is to be noted that, the fringe effects impose undesirable influences on sensing a touched position.

For both the single-end and dual-end outgoing line structures, the electrodes and wires of the touch sensing device are usually made of different conductive materials. For example, the former may be provided at an ITO layer, and the latter is often provided at a silver paste layer. Owing to a connection involving two heterogeneous materials at a contact location, i.e. bonding point, of the two, a considerable area is required for ensuring a stable contact between the two. For example, in FIG. 6, wire bonding points Bu are where the electrodes U and the wires Lu couple, and wire bonding points Bd are where the electrodes D and the wires Ld couple. For that the wire bonding points are relatively large in area, equivalent capacitance is also formed at the coupling locations/wire bonding points to erroneously couple an unexpected capacitance change. Preferably, the contact locations are also shielded.

Preferably, two or more same shaped electrodes are coupled to a group. However, between two same shaped electrodes is a differently shaped electrode, and so wire jumping is needed by routing that skips a middle electrode of a different type in order to group two electrodes of a same type. The wire jumping is particularly distinct for the single-end outgoing line structure. In FIG. 6, several wire jumping points Jc are schematically indicated. At the wire jumping points, the wires Ld need to go across the wires Lu while also keep being electrically insulated from the wires Lu, and so the wire jumping points Jc are realized by two conductive layers electrically insulated from each other. Further, the shielding described above also requires insulation from the wires Lu and Ld. Without appropriate arrangement, three conductive layers electrically insulated from one other (e.g., three silver paste layers) are needed to realize the wire jumping required for shielding and grouping.

Figure 7:
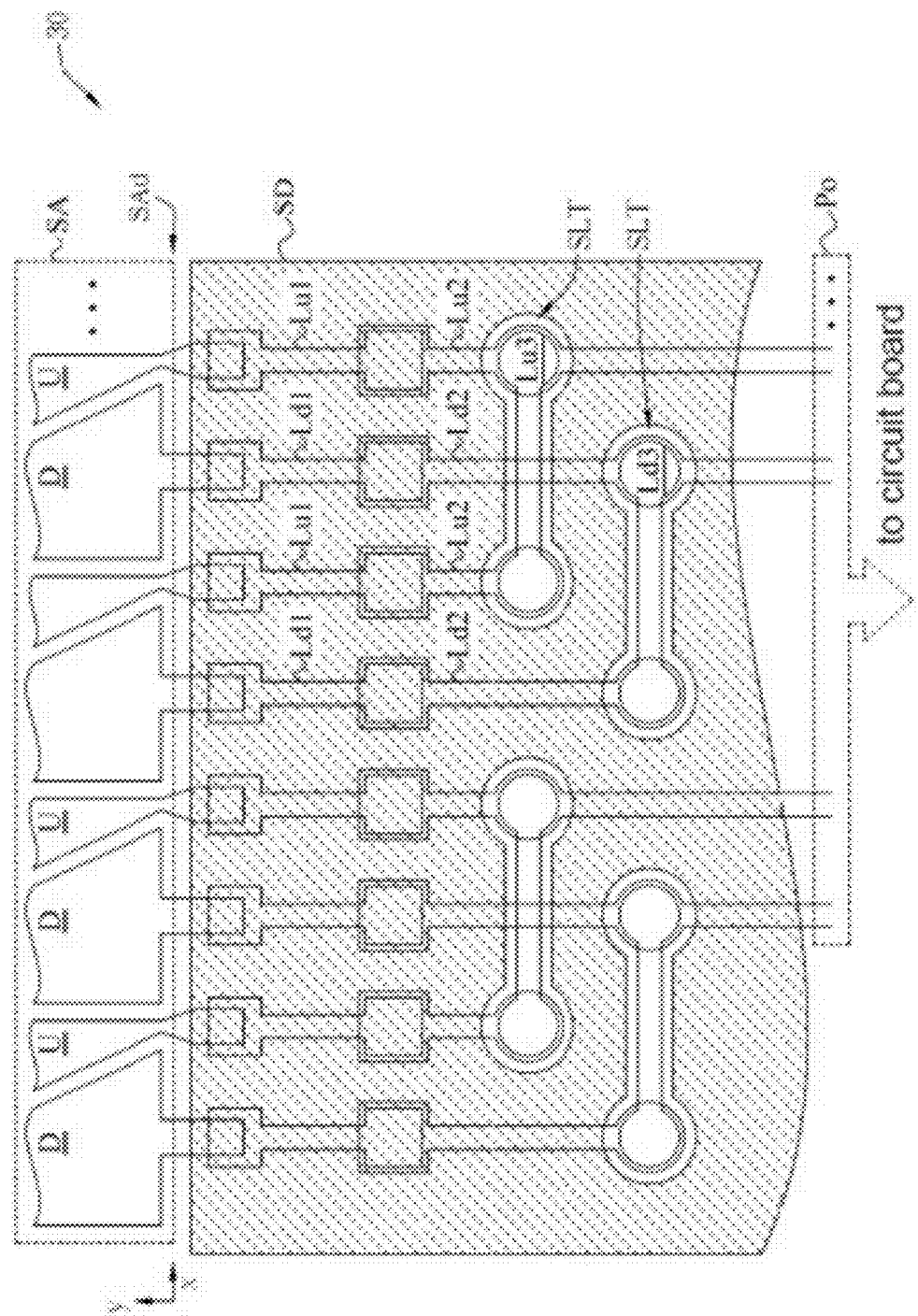
FIGS. 7 and 8 illustrate a touch sensing device according to another embodiment of the present invention.
Figure 8:
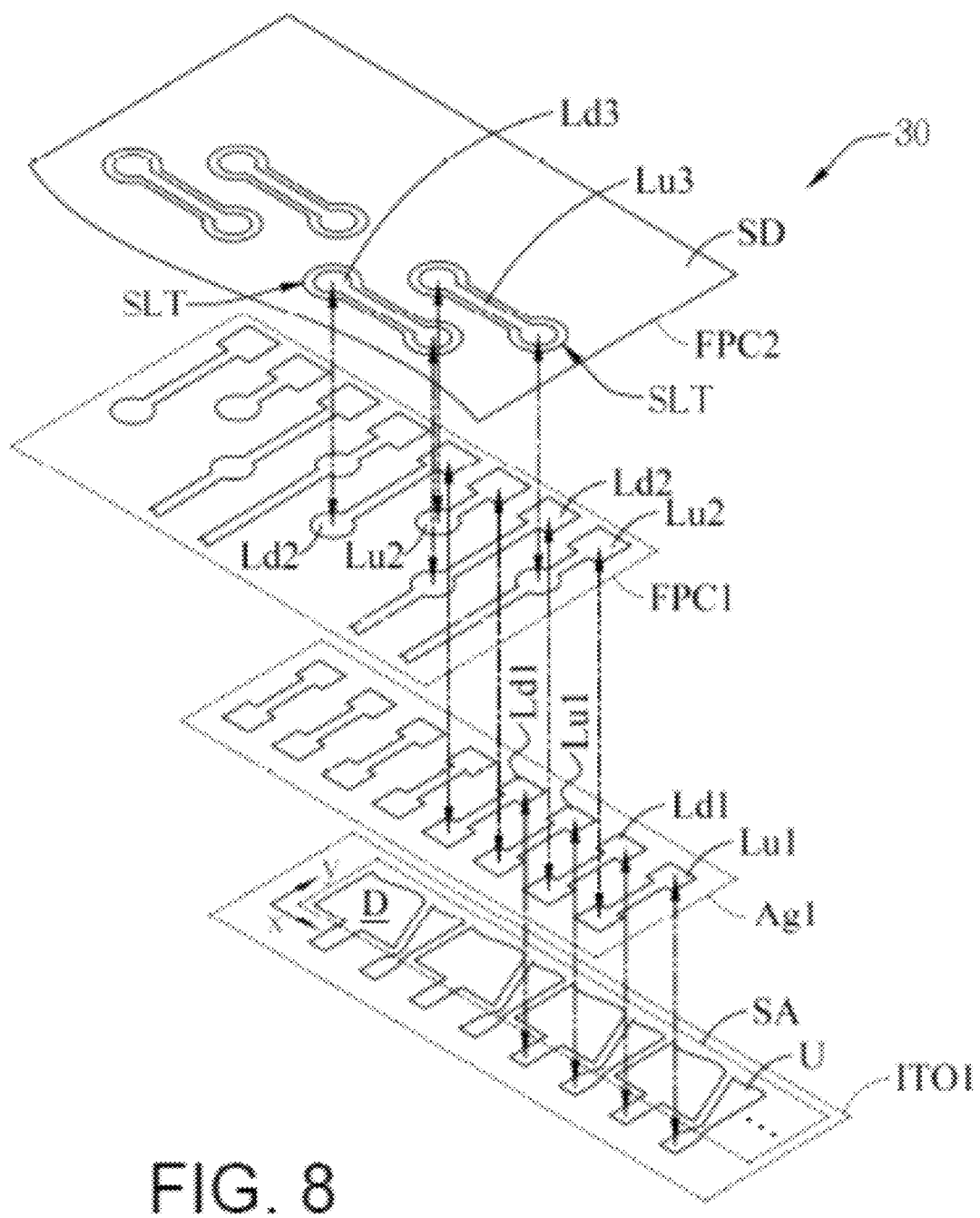

In another embodiment, to simplify the conductive layers required for grouping and shielding, two existing conductive layers of a circuit board, e.g. a flexible circuit board, are modified to respectively realize shielding and grouping. FIGS. 7 and 8 respectively show a plane view and an elevational view of a touch sensing device 30 according to an embodiment of the present invention. The touch sensing device 30 comprises a plurality of electrodes U and D (partially shown) provided at a conductive layer ITO1 (e.g., an ITO conductive layer). The conductive layer ITO1 constructs an xy plane, which comprises a sensing area SA where most of the electrodes U and D are distributed to sense a user touch. The electrodes U and D respectively have a small part thereof extended outside the sensing area SA to couple to corresponding wires Lu1 and Ld1. The wires Lu1 and Ld1 are provided at a same conductive layer Ag1, e.g., a silver paste layer. The wires Lu1 and Ld1 respectively have the other end thereof coupled to a corresponding wire Lu2 and Ld2. The wires Lu2 and Ld2 are electrically insulated from each other, and are provided at a same conductive layer FPC1 of the flexible circuit board. Wires Lu3 and Ld3 for grouping by wire jumping and a shielding plate SD are provided at another conductive layer FPC2 of the circuit board. For example, the conductive layer FPC2 is a conductive layer covered by copper, and is etched to form insulation slots SLT to separate the wires Lu3 and Ld3. The wires Lu3 then respectively coupled two or more wires Lu2 as one group, and the wires Ld3 then coupled two or more wires Ld2 as one group. That is to say, in two electrodes U of one group, the electrodes U are respectively coupled to the wires Lu3 via corresponding wires Lu1 and Lu2, and are capable of outputting a capacitance change sensed by the group via one of the wires Lu2. Similarly, in two electrodes D of one group, the electrodes D are respectively coupled to the wires Ld3 via corresponding wires Ld1 and Ld2, and are capable of outputting a capacitance change sensed by the group via one of the wires Ld2.

Referring to FIG. 7, the shielding plate SD formed by the conductive layer FPC2 shields the contacts between the wires Ld1-Ld2 and Lu1-Lu2. When determining positions of the wires Lu3, an appropriate distance is kept between the wires Lu3 and a lower side Sad of the sensing area SA, so that the wires Lu3 are prevented from coupling any unexpected capacitance change. Again with reference to FIGS. 7 and 8, since the touch sensing device 30 applies conductive layers of the flexible circuit board to realized both shielding and wire jumping, the touch sensing device 30 only requires an additional silver paste layer to realize the wires Lu1 and Ld1, thereby saving the conductive layers needed by the touch sensing device 30 as well as reducing cost and increasing yield rate of the touch sensing device 30. Preferably, the touch sensing device 30 is realized by a photo process. In the photo process, the ITO conductive layer ITO1 for the electrodes and the silver past layer Ag1 for the wires are electrically coupled with no insulation layer in between.

Figure 13:
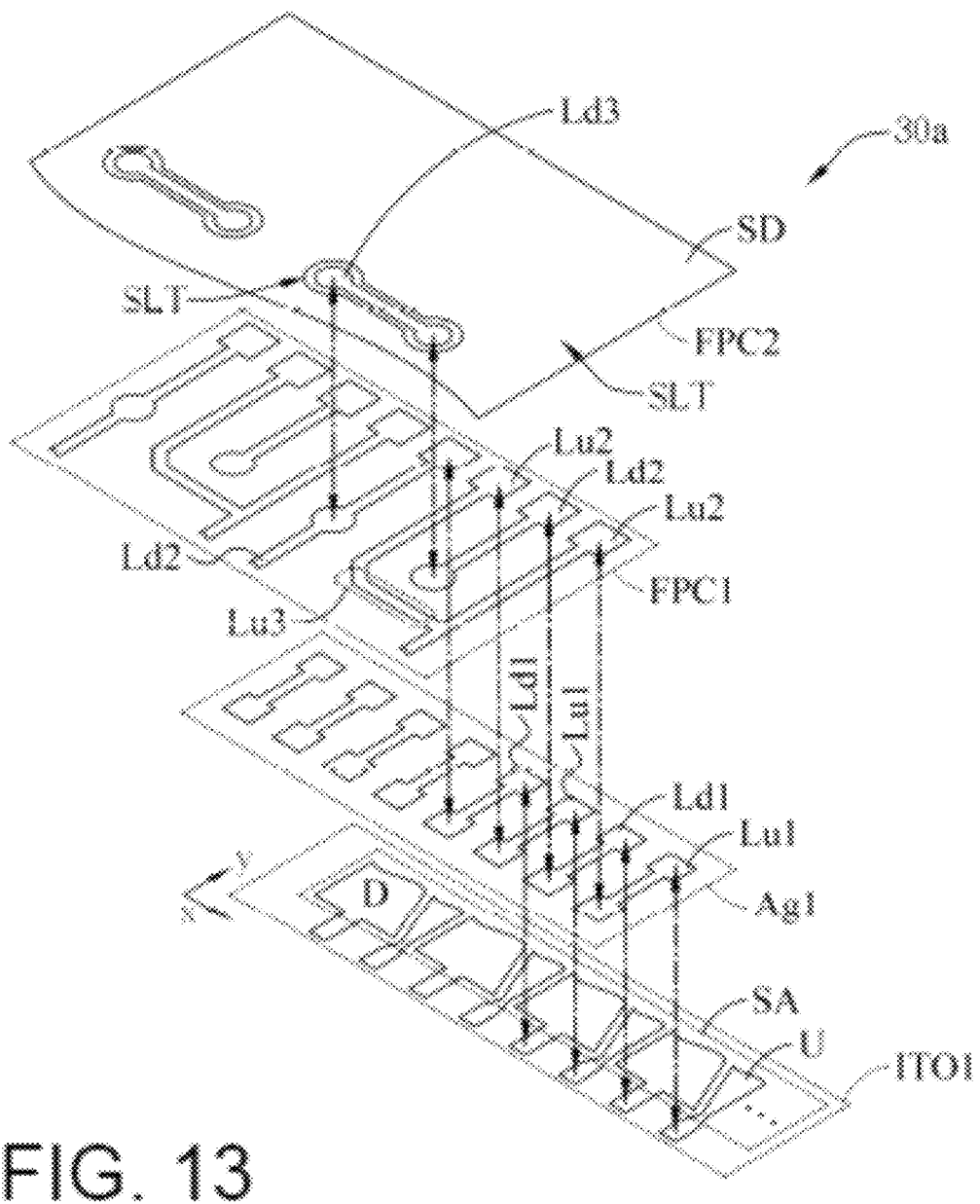

Continued from the embodiment shown in FIGS. 7 and 8, the description below is given with reference to FIGS. 13 and 14 respectively showing touch sensing device 30a and 30b according to embodiments of the present invention. In the touch sensing device 30a, wires Lu3 that respectively group two electrodes U via wire jumping and wires Lu2 are provided at a conductive layer FPC1 of a circuit board, e.g., a flexible circuit board, and wires Ld3 that respectively group two electrodes D via wire jumping and a shielding plate SD are provided at a conductive layer FPC2. That is, in two electrodes U grouped as one, the electrodes U are coupled via corresponding wire Lu1 on a conductive layer Ag1, Lu2 and Lu3 on the conductive layer FPC1, and output a capacitance change sensed by the group via one of the wires Lu2. In two electrodes D grouped as one, the electrodes D are coupled via corresponding wires Ld1 on the conductive layer Ag1 and L2 on the conductive layer FPC1 to the wires Ld3 on the conductive layer FPC2, and output a capacitance change sensed by the group via one of the wires Lu2. Under the structure, all wires coupling to the electrodes U are shielded by the shielding plate SD.

In the touch sensing device 30a, a sectional width of the electrodes D along an x direction increases from its upper end along a −y direction, and couples with the wires Ld1, Ld2 and Ld3 at its lower end where its sectional width is the greatest. When a user touched position moves from the upper end of the electrodes D towards the lower end, a capacitance change coupled by the electrodes D increases along with the increase of the sectional size (i.e., the section width). Therefore, even when a touched position is near or exceeds the shielding plate in a way that the wires Ld also couples the capacitance change, an outcome of coordinate analysis stays correct since the capacitance change of the electrodes D reflected by the wires Ld3 correctly increments in a gradual manner. That is, even when the wires Ld3 are near the lower end of the electrodes D, the performance of the touch sensing device 30a is not undesirably affected, so that larger design flexibilities are provided when arranging positions of the wires Ld3 of the touch sensing device 30a.

Figure 14:
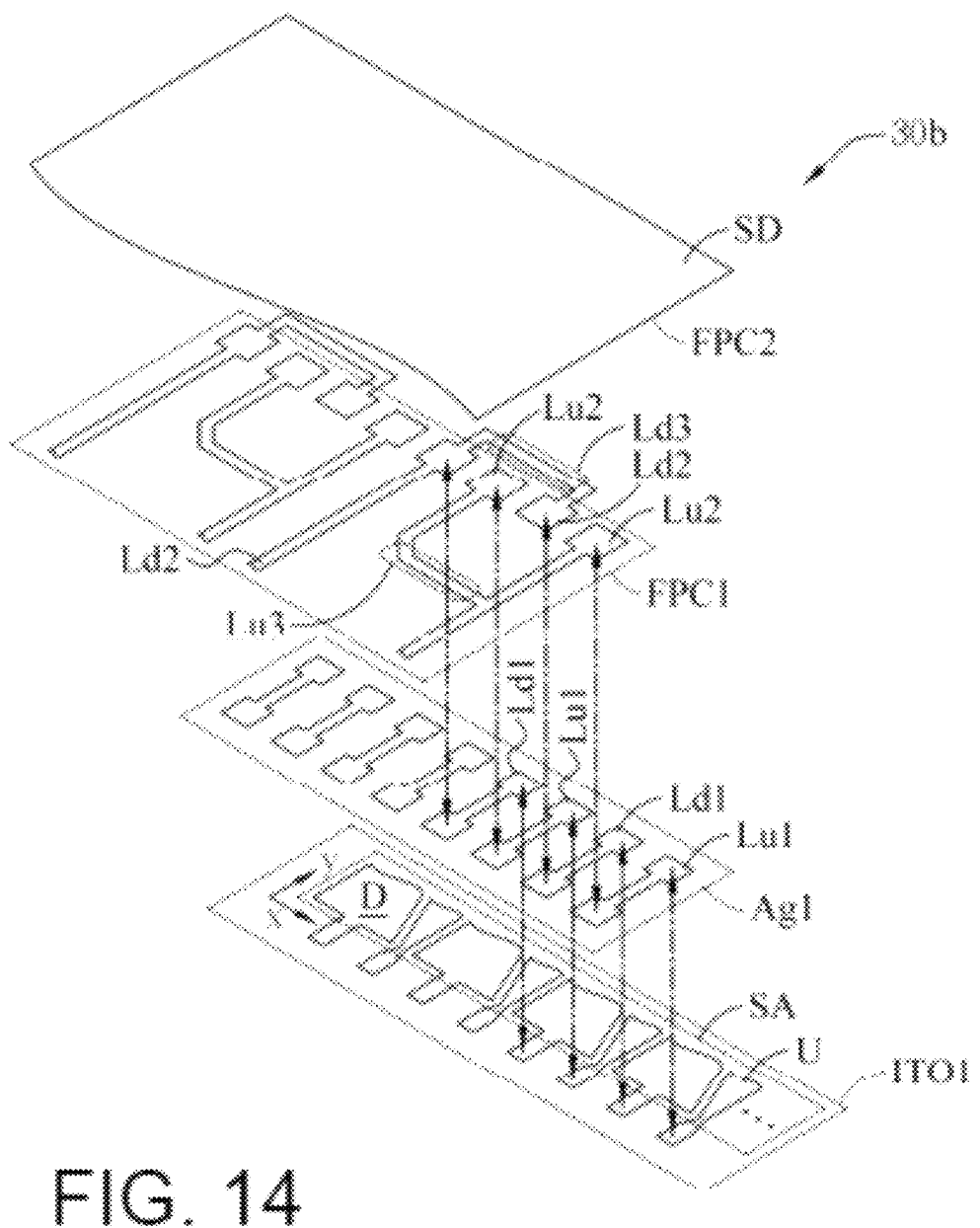

In the touch sensing device 30b in FIG. 14, wires Lu3 that respectively group two electrodes U via wire jumping and wires Lu2 are provided at a conductive layer FPC1 of a circuit board, e.g., a flexible circuit board, and wires Ld3 that respectively group two electrodes D and wires Ld2 are provided at a conductive layer FPC1. That is, in two electrodes U grouped as one, the electrodes U are coupled via corresponding wire Lu1 on a conductive layer Ag1, Lu2 and Lu3 on the conductive layer FPC1, and output a capacitance change sensed by the group via one of the wires Lu2. In two electrodes D grouped as one, the electrodes D are coupled via corresponding wires Ld1 on the conductive layer Ag1, Ld2 and Ld3 on the conductive layer FPC1, and output a capacitance change sensed by the group via one of the wires Lu2. Under the structure, a conductive layer forms a complete shielding plate SD, under which all wires coupling the electrodes U and L are shielded. In the touch sensing devices 30, 30a and 30b, the conductive layer Ag1 can be an ITO conductive layer manufactured by a printing process to eliminate additional processing of a silver paste layer.

Figure 9:
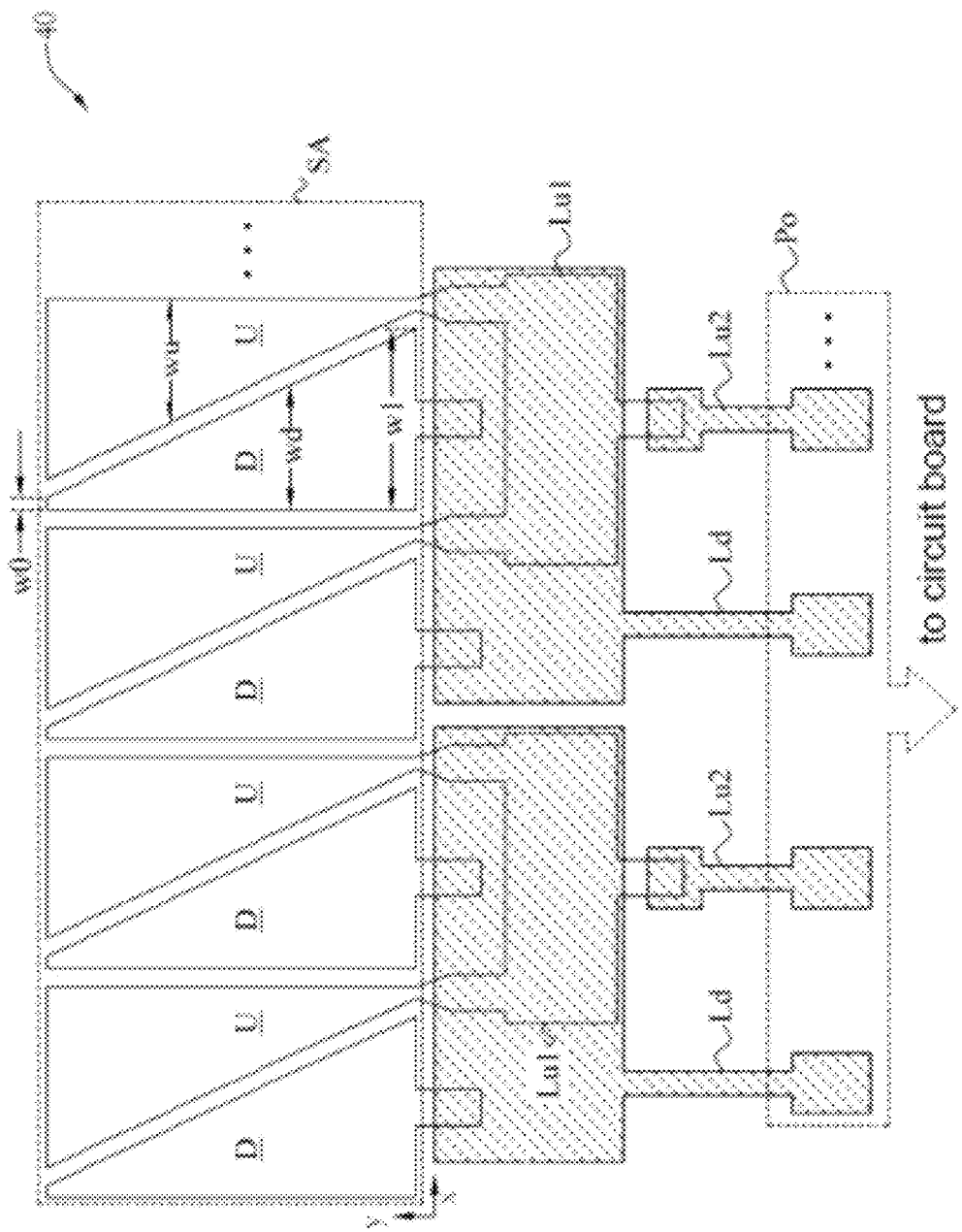
FIGS. 9 and 10 illustrate a touch sensing device according to yet another embodiment of the present invention.
Figure 10:
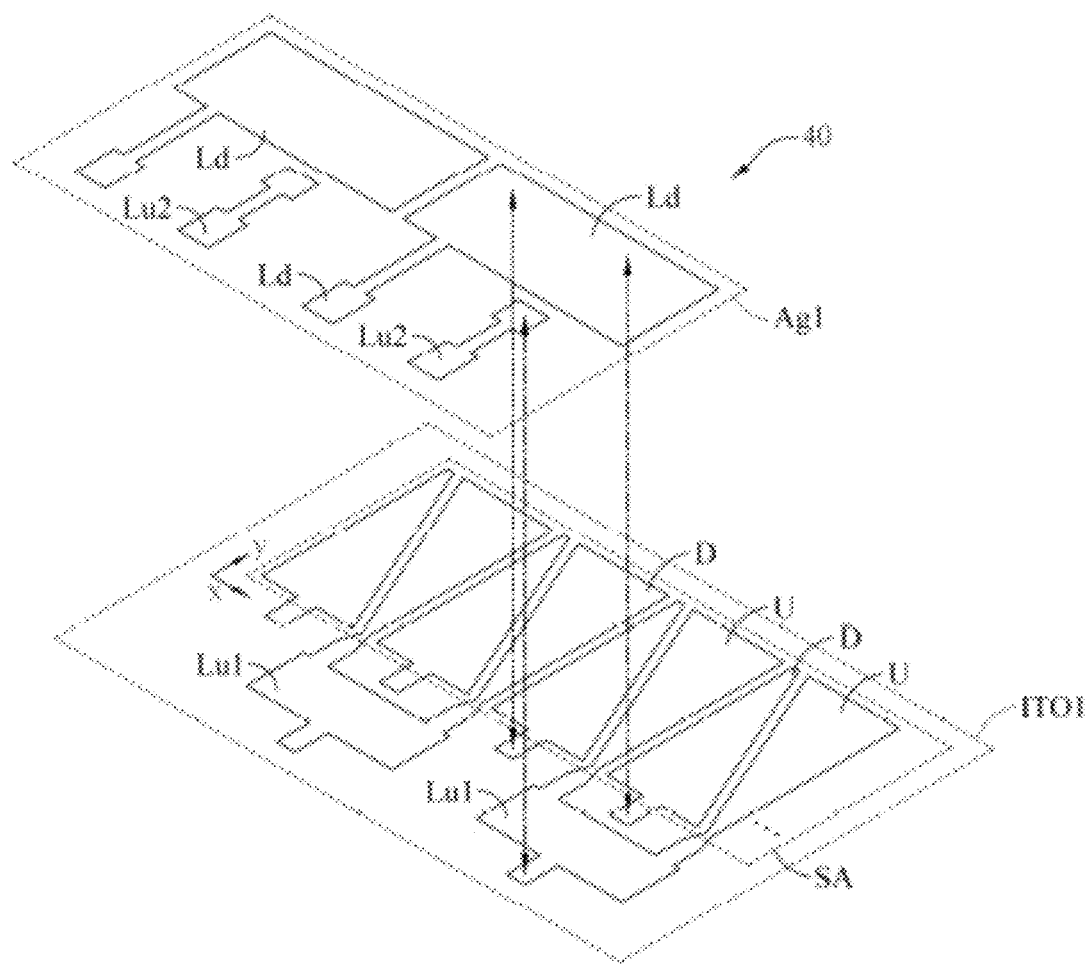

The printing process is different from the photo process. In the printing process, the ITO conductive layer provided with electrodes and the silver paste layer are electrically insulated by an insulation layer. FIGS. 9 and 10 respectively show a plane view and an elevational view of a touch sensing device 40 according to an embodiment of the present invention. The touch sensing device 40 can be suitably manufactured by the printing process. As shown in FIG. 10, in a conductive layer ITO1 of the touch sensing device 40, a plurality of electrodes U and a plurality of electrodes D are alternately arranged along an x direction, and wires Lu1 for respectively grouping two electrodes as one are also provided. To correspond to the wires Lu1, a conductive layer Ag1 is provided with wires Lu2 respectively coupled to a wire Lu to route the grouped electrodes to an output location Po. Further, wires Ld for respectively grouping two electrodes D are also provided at the conductive layer Ag1. Wires Ld are respectively electrically insulated from the wires Lu2, and are extended to form a shielding plate whose planar projection partially or entirely overlaps with a planar projection of at least one wire Lu1. More specifically, the wires Ld and the function of the shielding plate are integrated, such that the wires Lu1 are shielded by the wires Ld while keeping the wires Lu2 far from a sensing area SA. As shown in FIG. 9, a sectional width wd of the electrodes D along an x direction increases from a minimum width w0 at the top end to a maximum width w1 at the lower end along a −y direction, and the wires Ld are coupled to the electrodes D at the lower end of the electrodes D. When a user touched position moves from the upper end towards the lower end of the electrodes D, a capacitance change coupled by the electrodes D also increases along with the increase in the sectional size wd. As a result, even when the touched position is near or exceeds the lower end of the electrodes D in a way that the wires Ld also couples the capacitance change, an outcome of coordinate analysis stays correct since the capacitance change of the electrodes D reflected by the wires Ld3 correctly increments in a gradual manner. Therefore, the electrodes Ld may be extended as a shielding plate without deteriorating performance of touch sensing.

Figure 11:
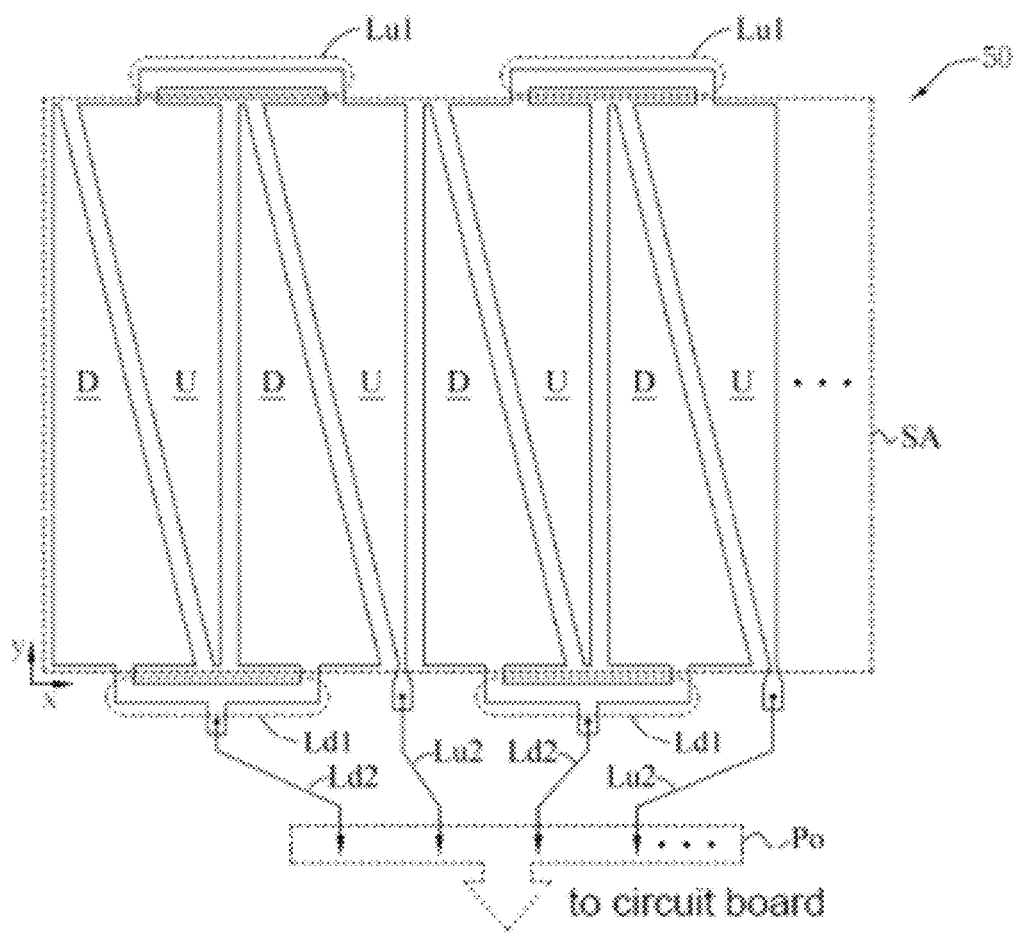
FIGS. 11 to 14 illustrate a touch sensing device according to embodiments of the present invention.

FIG. 11 shows a plane view of a touch sensing device 50 according to an embodiment of the present invention. Electrodes U and D, wires Lu1 for grouping the electrodes U and wires Ld1 for grouping the electrodes are all provided at a same conductive layer, e.g., an ITO conductive layer. The wires Lu1 respectively group two or more electrodes U at a wider upper end of the electrodes U, and the wires Ld1 respectively group two or more electrodes D at a wider lower end of the electrodes D. The wires Lu1 and Ld1 are respectively routed via wires Lu2 and Ld2 to an output region Po on a circuit board. Since the wires Lu1 and Ld1 for grouping are provided at a same conductive layer as the electrodes U and L, routing resources needed for grouping may also be simplified in this embodiment.

Figure 12:
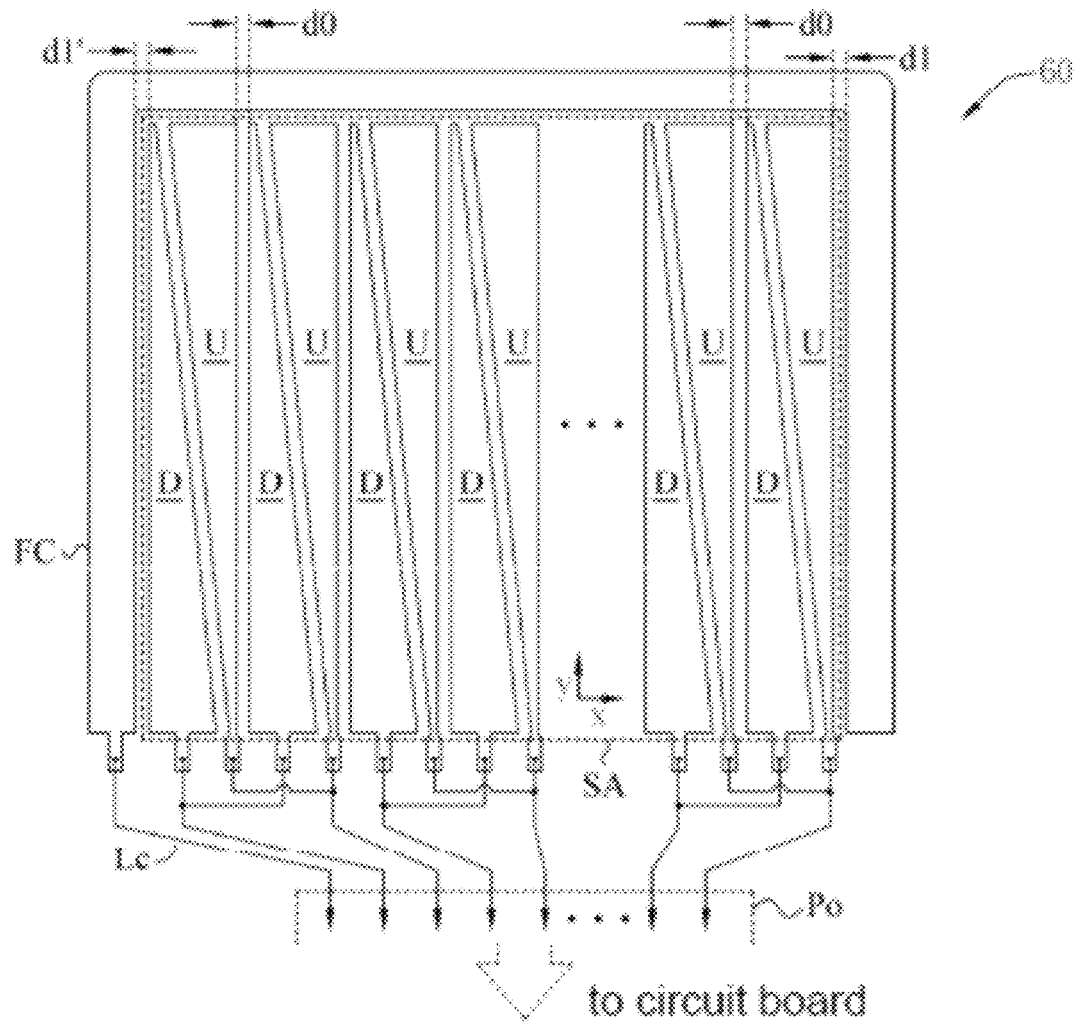

FIG. 12 shows a touch sensing device 60 according to another embodiment of the present invention. In description related to FIG. 6, it was mentioned that touch sensing electrodes located at two outermost sides likely to suffer from fringe effects. Therefore, the touch sensing device 60 in FIG. 12 is targeted as a solution for overcoming the fringe effects. In the touch sensing device 60, except electrodes U and electrodes D alternately arranged in a row along an x direction in a sensing area SA, outside the sensing area SA is additionally provided auxiliary electrode FC bordering the sensing area SA, so as to compensate the fringe effects as well as minimize undesirable influences that the fringe effects impose on sensing a touched position. The auxiliary electrode FC is provided at a same conductive layer with the electrodes U and D to match characteristics of the electrodes U and D. Further, a spacing distance d0 between the auxiliary electrode FC and a rightmost electrode U may be equal to a neighboring distance d0 between the electrodes U and D in the row; a spacing distance d1' between the auxiliary electrode FC and a leftmost electrode D may be equal the distance d0. Accordingly, ambient electrical characteristics of the leftmost electrode D and the rightmost electrode U are then similar to ambient electrical characteristics of the other electrodes D and U in the row, so that the sensing characteristics of the leftmost electrode D and the rightmost electrode U may match with those of the other electrodes D and U. As shown in FIG. 12, the auxiliary electrode FC may also route via a wire Lc to the output region Po on a circuit board. Since the auxiliary electrode FC extends along the sensing area SA by a relatively long length, the auxiliary electrode FC may also be covered by an extra silver paste layer to reinforce its conductive characteristics and frequency response.

In conclusion, a solution is provided by the present invention for overcoming fringe effects suffered by the conventional touch sensing device, thereby at the same time reducing cost and increasing yield rate as well as enhancing performance of the touch sensing device While the invention has been described by the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A touch sensing device, comprising:
 a plurality of electrodes, disposed on a plane and partially in a sensing area on the plane;
 a plurality of wires, respectively coupled to the electrodes, extending to outside the sensing area; and a conductive shielding plate, electrically insulated from the wires, covering a portion of the wires outside the sensing area, wherein each of the plurality of wires respectively comprises:
   a plurality of first wires, respectively coupled to the electrodes; and
   a second wire, coupled to the first wires, and
wherein, the second wire and the shielding plate are disposed at a same conductive layer.

2. The touch sensing device according to claim 1, wherein a projection of the shielding plate upon the plane is outside the sensing area, and wherein a projection of at least one of the wires upon the plane at least partially overlaps with the projection of the shielding plate upon the plane.

3. The touch sensing device according to claim 1, wherein the shielding plate borders the sensing area along at least two joining sides of the sensing area.

4. The touch sensing device according to claim 1, wherein for each of the plurality of wires the second wire and the shielding plate are disposed on a first conductive layer of a circuit board, wherein each of the wires is partially disposed on a second conductive layer of the circuit board, and wherein the first conductive layer is electrically insulated from the second conductive layer.

5. The touch sensing device according to claim 4, wherein the circuit board is a flexible circuit board.

6. The touch sensing device according to claim 4, wherein the first wires are disposed on the second conductive layer, wherein each of the plurality of wires further comprise a plurality of third wires respectively coupled between the electrodes and the second wires, and wherein the third wires are disposed on a third conductive layer.

7. The touch sensing device according to claim 6, wherein the third conductive layer is a silver paste layer.

8. The touch sensing device according to claim 6, wherein the third conductive layer is an indium tin oxide (ITO) conductive layer.

9. The touch sensing device according to claim 1, further comprising:
   a plurality of second electrodes, disposed on the plane; and
   a plurality of third wires, each comprising:
      a plurality of fourth wires, respectively coupled to the second electrodes; and
      a fifth wire, coupled to the fourth wires;
   wherein the fourth wires and the first wires are disposed on a same conductive layer.

10. The touch sensing device according to claim 9, wherein for each of the plurality of wires the second wire and the shielding plate are disposed on a first conductive layer of a circuit board, wherein each of the plurality of wires is partially disposed on a second conductive layer, wherein the fifth wire and the fourth wires are disposed on the second conductive layer, and wherein the first conductive layer is electrically insulated from the second conductive layer.

11. The touch sensing device according to claim 9, wherein the electrodes and the second electrodes are alternately arranged along a first direction.

12. The touch sensing device according to claim 1, wherein each electrode comprises an upper end and a lower end, wherein each electrode is coupled to the first wire at the lower end, and wherein a sectional size of each electrode gradually increases from the upper end towards the lower end in a predetermined direction.

13. A touch sensing device, comprising:
   a plurality of electrodes, disposed on a plane and partially in a sensing area on the plane;
   a plurality of wires, respectively coupled to the electrodes, extending to outside the sensing area; and
   a conductive shielding plate, electrically insulated from the wires, covering a portion of the wires outside the sensing area,
   wherein the electrodes comprise a plurality of first electrodes and a plurality of second electrodes,
   wherein the wires comprise a plurality of first wires and a plurality of second wires,
   wherein the first wires respectively correspond to the first electrodes,
   wherein the second wires respectively correspond to the second electrodes,
   wherein each first wire comprises:
      a plurality of third wires, respectively coupled to the first electrodes; and
      a fourth wire, coupled to the third wires;
   wherein the second wires respectively comprise:
      a plurality of fifth wires, respectively coupled to the second electrodes; and
      a sixth wire, coupled to the fifth wires, and
   wherein the third wires, the fourth wire, the fifth wires and the sixth wire are disposed on a first conductive layer of a circuit board, and the shielding plate is disposed on a second conductive layer of the circuit board.

14. The touch sensing device according to claim 13, wherein a projection of the shielding plate upon the plane is outside the sensing area, and wherein a projection of at least one of the wires upon the plane at least partially overlaps with the projection of the shielding plate upon the plane.

15. The touch sensing device according to claim 13, wherein the shielding plate borders the sensing area along at least two joining sides of the sensing area.

16. A touch sensing device, comprising:
   a plurality of first electrodes, disposed on a plane and partially in a sensing area on the plane;
   a plurality of second electrodes, disposed on the plane and partially in a sensing area, and electrically insulated from the first electrodes;
   a plurality of first wires, each first wire coupled to at least two of the first electrodes; and
   a plurality of second wires, each second wire coupled to at least two of the second electrodes;
   wherein the second wires, the first electrodes and the second electrodes are disposed on a same conductive layer,
   wherein the first wires are electrically insulated from the second wires,
   wherein the first wires are disposed on anther conductive layer, and
   wherein a projection of the first wires upon the plane partially overlaps with a projection of at least one of the second wires upon the plane.

17. The touch sensing device according to claim 16, wherein each first electrode comprises a first end and a second end, wherein a sectional size of each first electrode gradually increases from the first end towards the second end along a predetermined direction, and wherein each first wire is coupled to at least two of the first electrodes at the second end.

18. The touch sensing device according to claim 16, wherein the first electrodes and the second electrodes are alternately arranged along a predetermined direction.

* * * * *